United States Patent
Heo et al.

(10) Patent No.: US 10,147,964 B2
(45) Date of Patent: Dec. 4, 2018

(54) GASKET FOR FUEL CELL

(71) Applicant: Hyundai Motor Company, Seoul (KR)

(72) Inventors: Seong Il Heo, Gyeonggi-do (KR); Yoo Chang Yang, Gyeonggi-do (KR); Chi Seung Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 390 days.

(21) Appl. No.: 14/501,538

(22) Filed: Sep. 30, 2014

(65) Prior Publication Data
US 2015/0303495 A1  Oct. 22, 2015

(30) Foreign Application Priority Data
Apr. 16, 2014 (KR) .................. 10-2014-0045636

(51) Int. Cl.
| | |
|---|---|
| *H01M 8/0271* | (2016.01) |
| *H01M 8/0273* | (2016.01) |
| *H01M 8/0276* | (2016.01) |
| *H01M 8/241* | (2016.01) |
| *H01M 8/0267* | (2016.01) |
| *H01M 8/2457* | (2016.01) |
| *H01M 8/2483* | (2016.01) |
| *H01M 8/1018* | (2016.01) |

(52) U.S. Cl.
CPC ......... *H01M 8/241* (2013.01); *H01M 8/0267* (2013.01); *H01M 8/2457* (2016.02); *H01M 8/2483* (2016.02); *H01M 2008/1095* (2013.01)

(58) Field of Classification Search
CPC .............................. H01M 8/0276; H01M 2/08
See application file for complete search history.

(56) References Cited

U.S. PATENT DOCUMENTS

| | | | |
|---|---|---|---|
| 6,337,120 B1* | 1/2002 | Sasaki ................. | H01M 8/0271 428/304.4 |
| 7,276,310 B2 | 10/2007 | Kobayashi et al. | |
| 2003/0087142 A1* | 5/2003 | Kobayashi .......... | H01M 8/0271 429/469 |
| 2004/0234831 A1* | 11/2004 | Kobayashi ........... | H01M 8/242 429/483 |
| 2006/0083977 A1* | 4/2006 | Nagoshi .............. | H01M 8/0276 429/483 |
| 2010/0028742 A1* | 2/2010 | Jeon .................... | H01M 8/0258 429/465 |
| 2013/0171543 A1* | 7/2013 | Jin .................... | H01M 8/04029 429/508 |

FOREIGN PATENT DOCUMENTS

| | | |
|---|---|---|
| JP | 2007103248 A | 4/2007 |
| JP | 2009164081 A | 7/2009 |
| JP | 2011129267 A | 6/2011 |
| KR | 10-0793907 B1 | 1/2008 |
| KR | 10-2011-0015924 | 2/2011 |

* cited by examiner

*Primary Examiner* — James Lee
(74) *Attorney, Agent, or Firm* — Mintz Levin Cohn Ferris Glovsky and Pepeo, P.C.; Peter F. Corless

(57) ABSTRACT

A gasket for a fuel cell having plurality of protrusions coupled to a surface of a separation plate of the fuel cell and protruding from an air-tight line blocking movement between materials flowing along a plurality of manifolds, in a length direction of the separation plate is provided. In particular, each of the plurality of protrusions includes a groove having a set width.

7 Claims, 2 Drawing Sheets

[FIG. 1]
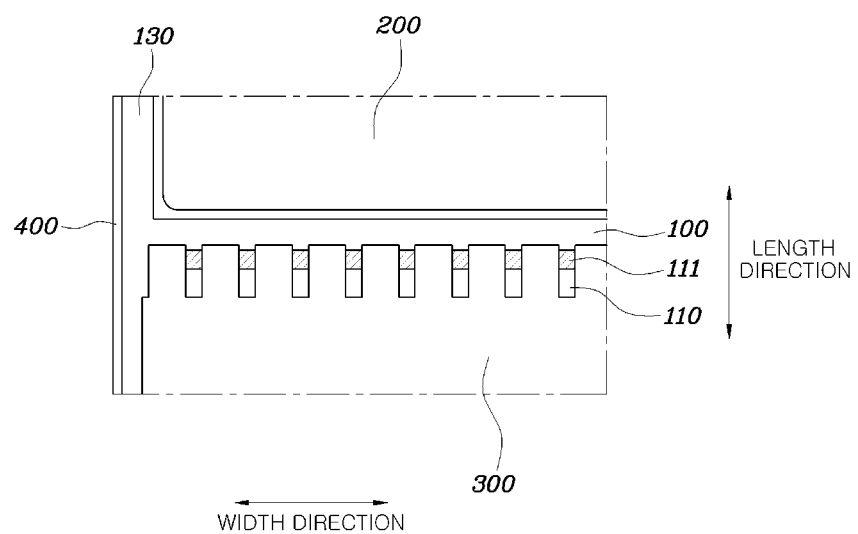
[FIG. 2]
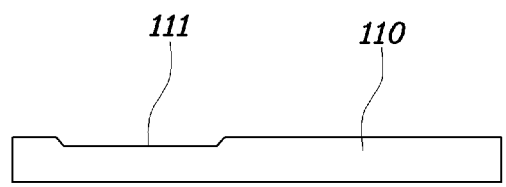

[FIG. 3]
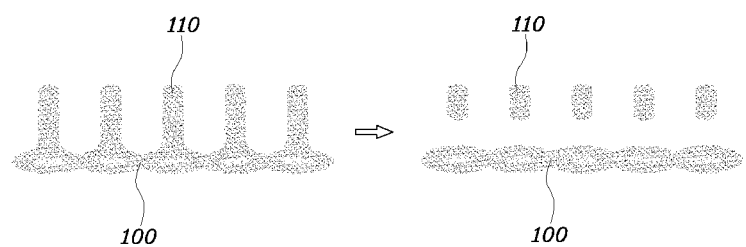
[FIG. 4]
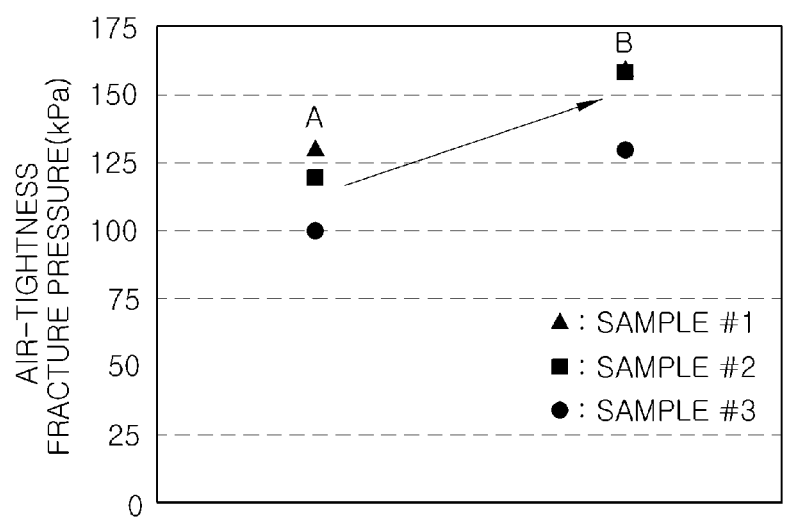

GASKET FOR FUEL CELL

CROSS REFERENCE TO RELATED APPLICATION

The present application claims priority to Korean Patent Application No. 10-2014-0045636, filed on Apr. 16, 2014, the entire contents of which is incorporated herein for all purposes by this reference.

BACKGROUND OF THE INVENTION

1. Technical Field

The present invention relates to a gasket for a fuel cell, and more particularly, to a gasket for a fuel cell capable of improving air tightness by increasing surface pressure of the gasket.

2. Description of the Related Art

A fuel cell generally includes a membrane electrode assembly (MEA) including a catalyst layer inducing a reaction between hydrogen and oxygen and separation plates disposed at both sides of the membrane electrode assembly and facilitating discharging of water while supplying the hydrogen and the oxygen into the membrane electrode assembly.

Both sides of the separation plate are typically provided with a plurality of manifolds so that the hydrogen, air, and coolant may flow once separation plates are stacked thereon. A gasket is provided along edges of the manifolds and the separation plates to seal the hydrogen, the air, and the coolant within the cell. As such, this gasket serves as a guide so that introduced hydrogen and air may move to a hydrogen catalyst layer and an air catalyst layer of the membrane electrode assembly, respectively, and maintains air tightness so that materials flowing along the respective manifolds do not move to adjacent manifolds.

In connection with this, a conventional art entitled "Separation Plate for Fuel Cell having Gasket for Maintaining Air Tightness and Method of Manufacturing the Same," provides a separate plate for a fuel cell having a gasket for maintaining air tightness characterized in that separation plates for a fuel cell having gaskets for maintaining air tightness and the gaskets and injection-molded on both surfaces of the separation plates and are continuously connected to each other to thereby be integrated with each other while forming one closed curve or ring like structure, wherein a first gasket of a first separation plate of the separation plates and includes: a side line injection-molded integrally along four corners on surfaces of an inner side and an outer side of the first separation plate; a 1-1-th main line passing through a region between an inner side of a hydrogen manifold and a hydrogen passing hole and then extended to a region adjacent to inner sides of a coolant manifold and an air manifold positioned on the same line as a line of the hydrogen manifold in a width direction on the surface of the outer side of the first separation plate; a 1-2-th main line extended, in the width direction, to a region between the hydrogen passing hole and a coolant channel and a region adjacent to the inner side of the air manifold positioned on the same line in the width direction on the surface of the inner side of the first separation plate; and a plurality of first coolant guide lines arranged in a length direction in a region between the coolant manifold and the coolant channel on the surface of the inner side of the first separation plate.

However, in spite of the related art as described above, a load is concentrated due to contact between guide lines when the separation plates are stacked. As such, the contact surface pressure between main lines becomes weak. As a result, materials flowing along the manifolds may mix with each. This is not ideal for optimum fuel cell performance.

The matters described as the related art have been provided only for assisting in the understanding for the background of the present invention and should not be considered as corresponding to the related art known to those skilled in the art.

SUMMARY OF THE INVENTION

An object of the present invention is to provide a gasket for a fuel cell capable of improving air tightness by forming a groove in a guide line to disperse a load concentration phenomenon occurring in the guide line to a portion of the guide line and a main line and increase surface pressure on the main line as a result.

According to an exemplary embodiment of the present invention, there is provided a gasket for a fuel cell that includes plurality of protrusions coupled to a surface of a separation plate of the fuel cell and protruding from an air-tight line that blocks movement between materials flowing along a plurality of manifolds in a length direction of the separation plate. In particular, each of the plurality of protrusions includes a groove having a set width.

The air-tight line, in the exemplary embodiment of the present invention, may be positioned between the manifold and a channel part of the separation plate. A height from the surface of the separation plate to a bottom surface of the groove may be less than a height from a bottom surface of the air-tight line contacting the surface of the separation plate to an upper surface of the air-tight line. Further, the height from the surface of the separation plate to the bottom surface of the groove may be lower than a height from the surface of the separation plate to the upper surface of the air-tight line when the air-tight line is in a compressed state due to stacking of the separation plates.

Additionally, in some exemplary embodiments, the protrusion may have one end coupled to the air-tight line, and the groove may be positioned at one end portion side of the protrusion. Both side portions of the groove corresponding to both side portions of the protrusion in the length direction may be opened.

BRIEF DESCRIPTION OF THE DRAWINGS

FIG. 1 is a diagram showing an air-tight line of a gasket for a fuel cell according to an exemplary embodiment of the present invention;

FIG. 2 is a view showing cross sections of a protrusion and a groove according to an exemplary embodiment of the present invention;

FIG. 3 is a view for comparing surface pressure distribution acting on the gasket for a fuel cell according to an exemplary embodiment of the present invention and surface pressure distribution acting on a gasket according to the related art with each other; and FIG. 4 is a diagram for comparing air-tightness fracture pressure of the gasket for a fuel cell according to an exemplary embodiment of the present invention and air-tightness fracture pressure of the gasket according to the related art with each other.

DESCRIPTION OF THE EXEMPLARY EMBODIMENTS

Hereinafter, a gasket for a fuel cell according to an exemplary embodiment of the present invention will be described with reference to the accompanying drawings.

FIG. 1 is a view showing an air-tight line 100 of a gasket for a fuel cell according to an exemplary embodiment of the present invention. The gasket for a fuel cell according to an exemplary embodiment of the present invention includes a plurality of protrusions 110 coupled to a surface of a separation plate 400 of the fuel cell and protruding from the air-tight line 100 that blocks movement between materials flowing along a plurality of manifolds 200, in a length direction of the separation plate 400. Each of the plurality of protrusions 110 also includes a groove 111 having a set width. That is, each of these plurality of protrusions 110 has the groove 111, such that surface pressure applied to the air-tight line 100 is increased, thereby making it possible to improve air-tightness.

A configuration and an effect of the present invention will be described in detail. The air-tight line 100, which is formed in a width direction so as to be perpendicular to a length of the separation plate 400, as shown in FIG. 1, is positioned adjacently to the plurality of manifolds 200 between the plurality of manifolds 200 formed at both end portions of the separation plate 400 and a channel part 300 of the separation plate 400.

Here, the channel part 300 of the separation plate 400, which includes a channel formed between both end portions of the separation plate 400, serves to supply hydrogen and air to a membrane electrode assembly (MEA) of a cell of the fuel cell. The air-tight line 100 is positioned adjacently to the plurality of manifolds 200 in order to selectively introduce or block hydrogen, oxygen, or a coolant. A side line 130 extended from the air-tight line 100 and formed along a circumferential part of the plurality of manifolds 200 and a circumferential part of the separation plate 400 is further provided, and the air-tight lines 100 and the side lines 130 formed in the respective separation plates 400 contact each other once the separation plates 400 are stacked to maintain air-tightness in all of the separation plates 400. A contact state between the side lines 130 and the separation plates 400 at the time of the stacking may be similar to a contact state known in the related art.

Meanwhile, the air-tight line 100 is provided with the plurality of protrusions 110 extended along a length of the air-tight line 100 in the width direction of the separation plate 400, and the grooves 111 are formed in the protrusions 110, respectively, thereby making it possible to increase surface pressure applied to the air-tight line 100 at the time of stacking the separation plates 400.

In more detail, when a plurality of separation plates 400 are stacked, the protrusions 110 contact each other in addition to the air-tight lines 100 and the side lines 130 formed in the respective separation plates 400. According to the related art, areas of the protrusions 110 are smaller than that of the air-tight line 100, such that a load is concentrated on the protrusions 110. As a result, surface pressure of the air-tight line 100 is relatively less than surface pressure applied to the protrusions 110.

In the present invention, the grooves 111 are formed in the protrusions 110, respectively, to partially decrease a contact area between the protrusions 110 once the separation plates 400 are stacked, such that a load is dispersed, thereby making it possible to increase the surface pressure applied to the air-tight line 100.

As such, the grooves 111 will be described in more detail with reference to FIG. 2. FIG. 2 is a view showing cross sections of a protrusion and a groove according to an exemplary embodiment of the present invention. It is preferable that a height from the surface of the separation plate 400 to a bottom surface of the groove 111 is less than a height from a bottom surface of the air-tight line 100 contacting the surface of the separation plate 400 to an upper surface of the air-tight line 100. Here, it is preferable that the groove 111 is formed on an upper surface of the protrusion 110.

Although heights of the air-tight line 100 and the protrusion 110 may be set to any height, a height up to the bottom surface of the groove 111 is limited to less than that of the air-tight line 100 in order to allow a larger load to be applied to the air-tight line 100 at the time of stacking the separation plates 400.

In detail, it is preferable that the height from the surface of the separation plate 400 to the bottom surface of the groove 111 is less than a height from the surface of the separation plate 400 to the upper surface of the air-tight line 100 when the air-tight line 100 is in a compression state due to the stacking of the separation plates 400.

Generally, the plurality of separation plates 400 are pressed by a pair of end plates disposed adjacently to the outermost separation plates 400, respectively, when the cells are stacked. Since the air-tight line 100 and the protrusions 110 contacting each other are compressed by the pressing, the grooves 111 are formed so as to have a height less than a height at which the air-tight line 100 is maximally compressed by multiplying a height of the air-tight line 100 before being compressed by a preset compression rate of a material of the air-tight line 100 so that the contact is not generated at positions at which the grooves 111 are formed after the plurality of separation plates 400 are pressed by the end plates.

Meanwhile, it is preferable that the protrusion 110 has one end coupled to the air-tight line 100 and the groove 111 is positioned at one end portion side of the protrusion 110. That is, it is preferable that the groove 111 is positioned adjacently to the air-tight line 100 in order to decrease the contact area of the air-tight line 100 and to increase the surface pressure applied to the air-tight line 100. It should be noted, however, that the position of the groove 111 may be variously set.

In addition, it is preferable that both side portions of the groove 111 corresponding to both side portions of the protrusion 110 in the length direction are opened. Here, when both side portions of the protrusion 110 in the length direction are opened, both side portions of the groove 111 are completely opened and a wall is formed only in the length direction of the protrusion 110. This is to increase the surface pressure of the air-tight line 100 by preventing contact at the positions at which the grooves 111 are formed once the separation plates 400 are stacked.

Both side portions of the groove 111 may not necessarily be opened, but may be provided with a wall, and a diameter of the groove 111 may be set to a size large enough to increase the surface pressure acting on the air-tight line 100. In addition, both side portions of the groove 111 may not be completely opened. Rather, only upper end portions of both side portions of the groove 111 may be opened in some embodiments.

Meanwhile, it is preferable that the groove 111 is formed in all of the plurality of protrusions 110. However, the groove 111 may be selectively formed in only some of the plurality of protrusions 110 or may be formed only in any one of a pair of protrusions 110 provided in each of a pair of separation plates 400 and contacting each other. Various examples are possible with respect to formation of the groove 111, a position on the groove 111 on the protrusion 110, and a shape of the groove 111.

An effect of the gasket for a fuel cell according to an exemplary embodiment of the present invention may be confirmed through an experiment result shown in FIGS. 3 and 4.

FIG. 3 is a view for comparing surface pressure distribution acting on the gasket for a fuel cell according to an exemplary embodiment of the present invention and surface pressure distribution acting on a gasket according to the related art with each other. The left of FIG. 3 shows the surface pressure distribution acting on the gasket according to the related art, and the right of FIG. 3 shows the surface pressure distribution acting on the gasket according to an exemplary embodiment of the present invention. Both of the left and the right of FIG. 3 show the surface pressure acting on the air-tight line 100 and the protrusions 110. The more dense the dots, the larger the surface pressure.

As shown in FIG. 3, in the gasket according to the related art, a load is concentrated on all of the protrusions 110. However, it may be confirmed that a surface pressure improvement effect of about 20% occurs in the air-tight line 100 in the gasket according to an exemplary embodiment of the present invention as compared with the related art.

In addition, FIG. 4 is a diagram showing air-tightness fracture pressure, that is, a value at which air-tightness is fractured, of the gasket for a fuel cell according to an exemplary embodiment of the present invention and air-tightness fracture pressure of the gasket according to the related art. The left A of FIG. 4 shows the air-tightness fracture pressure of the gasket according to the related art, and the right B of FIG. 4 shows the air-tightness fracture pressure of the gasket for a fuel cell according to an exemplary embodiment of the present invention.

It may be confirmed through the experimental data that fracture occurs at 120 kPa in the gasket according to the related art, while fracture occurs at 150 kPa in the gasket for a fuel cell according to an exemplary embodiment of the present invention, which means that performance is improved by about 25%. That is, it may be appreciated that the gasket for a fuel cell according to an exemplary embodiment of the present invention maintains more excellent air-tightness due to an increase in the surface pressure of the air-tight line 100.

With the gasket for a fuel cell having the structure as described above, the surface pressure of the air-tight line 100 is increased to prevent mixing between materials flowing along the manifolds, thereby making it possible to improve durability of the fuel cell and prevent deterioration of performance of the fuel cell. In addition, air-tightness may be increased through a change of a shape of the gasket without installing an additional apparatus, thereby making it possible to decrease a cost and improve marketability.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A gasket for a fuel cell, comprising:
an air-tight line blocking movement between materials flowing along a plurality of manifolds;
a plurality of protrusions coupled to a surface of a separation plate of the fuel cell and protruding from the air-tight line in a length direction of the separation plate,
wherein each of the plurality of protrusions includes a groove formed therein,
wherein a contact surface pressure of the groove is lower than both a contact surface pressure of the air-tight line and a contact surface pressure of the plurality of protrusions when the gasket is in a compressed state,
wherein each groove is spaced apart from each other,
wherein each of the plurality of protrusions has one end portion coupled to the air-tight line, and the groove is positioned at the one end portion of a respective protrusion of the plurality of protrusions, and
wherein the groove is located where the air-tight line and the respective protrusion meet, and a depth of the groove is less than a thickness of the respective protrusion in a stack direction.

2. The gasket for a fuel cell of claim 1, wherein the air-tight line is positioned between any one of the plurality of manifolds and a channel part of the separation plate.

3. The gasket for a fuel cell of claim 1, wherein a height from the surface of the separation plate to a bottom surface of the groove is lower than a height from a bottom surface of the air-tight line contacting the surface of the separation plate to an upper surface of the air-tight line.

4. The gasket for a fuel cell of claim 3, wherein the height from the surface of the separation plate to the bottom surface of the groove is lower than a height from the surface of the separation plate to the upper surface of the air-tight line when the air-tight line is in a compression state by stacking of the separation plate.

5. The gasket for a fuel cell of claim 1, wherein both side portions of the groove corresponding to both side portions of any one of the plurality of protrusions in the length direction are opened.

6. The gasket for a fuel cell of claim 1, wherein the contact surface pressure of the groove is positioned between the contact surface pressure of the air-tight line and the contact surface pressure of the respective protrusion.

7. The gasket for a fuel cell of claim 6, wherein the contact surface pressure of the respective protrusion is excluded from the contact surface pressure of the groove formed in a length direction of the respective protrusion.

* * * * *